United States Patent
Youngner

(10) Patent No.: US 6,710,355 B2
(45) Date of Patent: Mar. 23, 2004

(54) OPTICALLY POWERED RESONANT INTEGRATED MICROSTRUCTURE PRESSURE SENSOR

(75) Inventor: Daniel W. Youngner, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 62 days.

(21) Appl. No.: 10/071,484

(22) Filed: Feb. 7, 2002

(65) Prior Publication Data

US 2003/0146393 A1 Aug. 7, 2003

(51) Int. Cl.⁷ .............................. G02B 6/00; G01J 1/04
(52) U.S. Cl. ................................ 250/458.1; 250/459.1; 73/862.59
(58) Field of Search .................... 250/458.1, 459.1, 250/227.14, 227.16, 227.19; 367/140; 73/862.59, 653, 378, 328

(56) References Cited

U.S. PATENT DOCUMENTS

| | | | |
|---|---|---|---|
| 5,090,254 A | * 2/1992 | Guckel et al. | 73/862.59 |
| 5,101,664 A | * 4/1992 | Hockaday et al. | 73/704 |
| 5,559,358 A | 9/1996 | Burns et al. | |
| 5,747,705 A | * 5/1998 | Herb et al. | 73/862.59 |
| 5,808,210 A | 9/1998 | Herb et al. | |
| 5,844,236 A | * 12/1998 | Wilson | 250/227.14 |
| 5,959,338 A | 9/1999 | Youngner et al. | |
| 6,031,944 A | 2/2000 | Youngner | |
| 6,126,140 A | 10/2000 | Johnson et al. | |

2003/0078487 A1 * 4/2003 Jeffries et al. .............. 600/398

OTHER PUBLICATIONS

H. Guckel et al., "Polysilicon Resonant Microbeam Technology for High Performance Sensor Applications", pp. 153–156, 1992.

H. Guckel et al., "Polysilicon Resonant Microbeam Technology for High Performance Sensor Applications", 2 pages, 1992.

Burns et al., "A Digital Pressure Sensor Based on Resonant Microbeams", Solid–State Sensor and Actuator Workshop Hilton Head, South Carolina, Jun. 13–16, 1994, pp. 221–224.

* cited by examiner

Primary Examiner—Constantine Hannaher
Assistant Examiner—Otilia Gabor
(74) Attorney, Agent, or Firm—Kris T. Fredrick

(57) ABSTRACT

A pressure sensor using an optically powered resonant integrated microstructure (O-RIMS). The pressure sensor comprises a planar substrate having a photodiode, a polysilicon shell, a microbeam having a resonant frequency and fastened to the shell, and one or more optical fibers. A fluorescent material, such as erbium, is placed on the surface of the substrate in proximity to the microbeam. A Fabry-Perot cavity is formed comprising the substrate, the microbeam, and the shell. Changes in the vibratory frequency of the microbeam caused by pressure on the shell causes light delivered by a optical fiber to be modulated as the microbeam vibrates. The modulated light is conveyed to a sensor electronics arrangement via the optical fiber. The sensor electronics arrangement determines the pressure surrounding the O-RIMS from the modulated light.

59 Claims, 6 Drawing Sheets

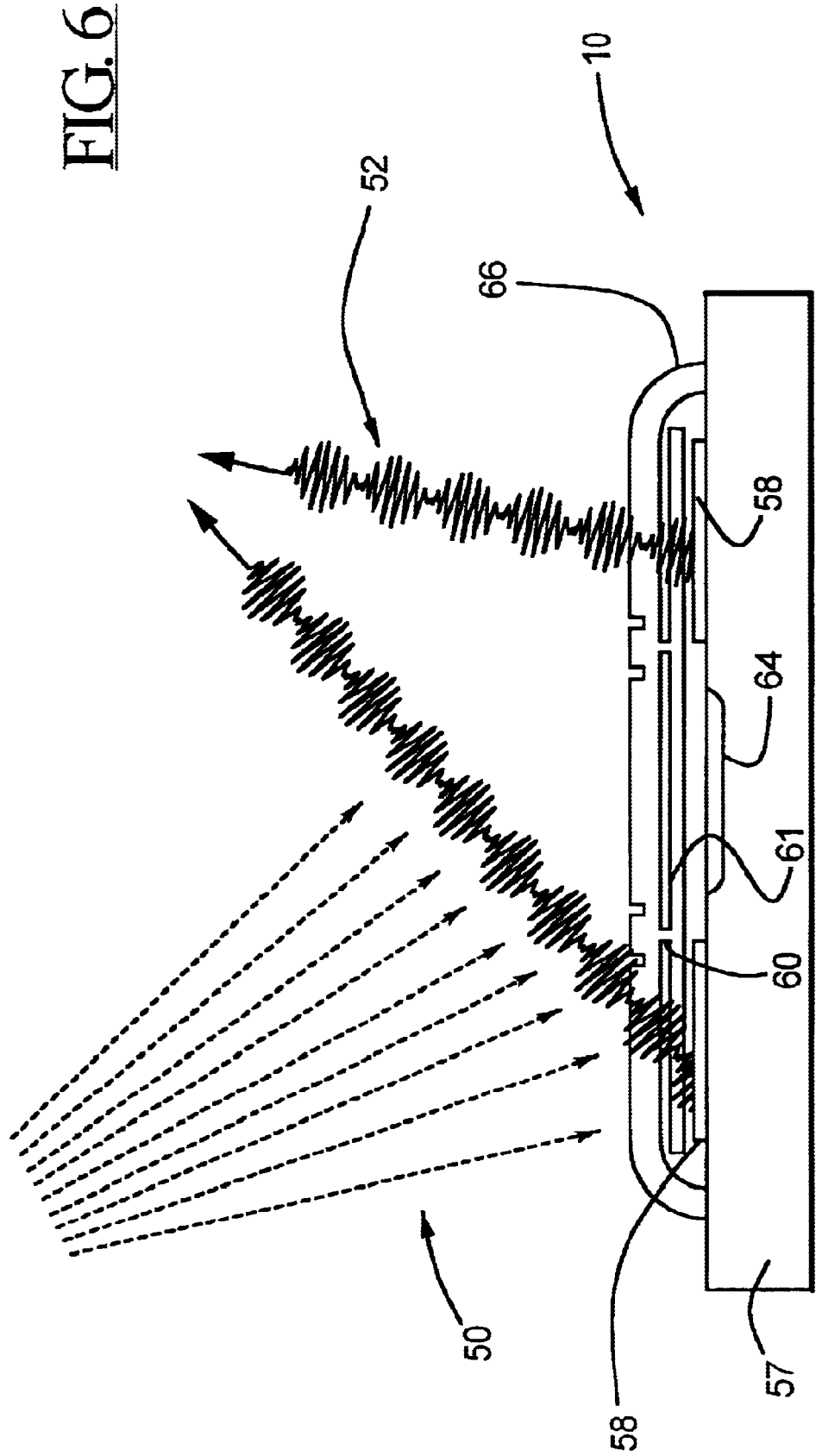

OPTICALLY POWERED RESONANT INTEGRATED MICROSTRUCTURE PRESSURE SENSOR

TECHNICAL FIELD OF THE INVENTION

The present invention relates to a pressure sensing device, and more particularly, to a pressure sensing device incorporating an optically powered resonant integrated microstructure (O-RIM).

BACKGROUND OF THE INVENTION

In a typical O-RIMS (optically powered resonant integrated microstructure) device, a microbeam having a resonant frequency is fastened to the shell by two supports and is vacuum encapsulated by a polysilicon shell. The microbeam and the shell are supported by a silicon substrate, all of which together form a micromachined integrated silicon device. A typical O-RIMS device is further provided with an optical fiber which is positioned in proximity to the resonant microbeam.

The shell, the microbeam and the substrate create a set of Fabry-Perot cavities, such that light reflected from these surfaces interfere with one another as they re-enter the optical fiber, creating an optical signal whose intensity changes as the microbeam moves up and down. Thus, the beat frequency of the reflected light indicates the frequency of vibration of the microbeam.

Light generated by a light emitting diode (LED), a laser or other light source arrives at the O-RIMS device via the optical fiber, passes through the shell, partially through the microbeam, and on to a photodiode situated beneath the resonant microbeam. The shell is partially reflective and partially transparent to the arriving light. A portion of the light passing through the shell is reflected from the microbeam, through the shell, and back into the optical fiber.

The microbeam is excited to resonance by the arrival of the light though the optical fiber striking the photodiode causing charge to build up there, creating an electrostatic attraction to the microbeam. The electrostatic attraction causes the microbeam to flex, and as the microbeam approaches its maximum flexure, its potential energy builds to a point where its restoring force overcomes the electrostatic attraction. The microbeam then springs toward a neutral or resting position, where the electrostatic attraction builds again, flexing the microbeam again, and exciting resonance in the microbeam.

The basic premise of an O-RIMS pressure sensor is that, by monitoring the resonant frequency of the resonant beam, the pressure in the medium surrounding the shell of the device can be determined, because the resonant frequency of the microbeam changes when the beam's supports are moved further apart or brought closer together. Therefore, when the shell deforms under the applied pressure, the supports move further apart or are brought closer together, thereby causing the resonant frequency of the microbeam to change.

In earlier O-RIMS pressure sensing devices, a single wavelength of light was used both to drive the microbeam into resonance and to detect the motion of the microbeam. In an alternative version of the earlier devices, one wavelength of light was used to drive the device, and another was used to detect vibration of the microbeam. In either case, detection of microbeam vibration was achieved by illuminating a relatively broad area around the microbeam, and then detecting changes in the intensity of light caused by the motion of the microbeam. Therefore, if the microbeam area is only a small fraction of the total illuminated area, it is very difficult to find the signal amidst all of the background light/noise. As a practical matter, the optical fiber should be very close (e.g., a few tens of microns) to the microbeam to insure that an adequate signal to noise ratio is achieved.

The pressure sensor of the present invention improves upon the pressure sensing capabilities of earlier such devices by placing a fluorescent material (e.g. erbium) under a portion of the microbeam, such that a Fabry-Perot cavity comprising the erbium coated substrate, the microbeam, and the shell is formed.

Changing dimensions of the Fabry-Perot cavity causes light that escapes from the device to be modulated as the resonant frequency of the microbeam changes in response to pressure on the shell. Since virtually all of the fluorescent light has to pass through the Fabry-Perot cavity to get to a light transporter, such as an optical fiber or an optical waveguide, the signal at the light transporter is strongly modulated. Thus, it is relatively easy to detect the change in vibratory motion of the microbeam.

Accordingly, the present invention offers a very high signal-to-noise ratio when a fluorescent material such as erbium is used. This very high signal-to-noise ratio is due to the fact that erbium fluoresces at 1.55 microns when illuminated at 900 nm, unlike few naturally occurring materials. Moreover, black body radiation in room temperature objects is very low at 1.55 microns.

In addition, the present invention is practically immune to background noise in many applications, because the signal from the modulated erbium at a wavelength of 1.55 microns is low. However, the background noise is low too, thereby further accounting for the high signal-to-noise ratio.

The present invention requires no external electric power because the optical power required to drive the microbeam into resonance is very low (estimated to be in the nanowatt range). Thus, it is practical to power this device only with light. Moreover, since no electrical power is required, device packaging is greatly simplified, and the operative component of the device can comprise the O-RIMS structure on an appropriately designed die bonded directly to the tip of an optical fiber. Hence, the complete sensor can have a diameter no bigger than the tip of the optical fiber.

In addition, the sensors can be mass produced cheaply using microelectronic machining system (MEMS) technology.

SUMMARY OF THE INVENTION

In accordance with one aspect of the present invention, a pressure sensing device comprises a substrate having a fluorescent region, a shell having an outer surface and an inner surface, a beam affixed to the inner surface of the shell by two posts, a first light transporter having a distal end and an end proximate the outer surface of the shell in an area adjacent the beam and the fluorescent region, and a second light transporter having a distal end and an end proximate the outer surface of the shell in an area adjacent the beam and the fluorescent region.

In accordance with another aspect of the present invention, a method for sensing pressure using a vacuum cavity device having at least one fluorescent region and a pressure sensitive resonant beam comprises directing a first light wave toward the pressure sensitive resonant beam and the fluorescent region, exciting the pressure sensitive resonant beam to a resonant frequency in response to the first light wave, and transmitting away from the pressure sensitive resonant beam a second light wave generated by the fluorescent region in response to the first light wave, the first and second light waves having different wavelengths, the second light wave having a property corresponding to the resonant frequency of the pressure sensitive resonant beam.

In accordance with a further aspect of the present invention, an optically powered integrated microstructure remote pressure sensor comprises a substrate, a microbeam, a, photodiode, and first and second light transporters. The substrate supports a polysilicon shell having an outer surface and an inner surface, the inner surface defines an evacuated cavity enclosing an area of the substrate, and the substrate is provided with a fluorescent region. The microbeam is affixed to the inner surface of the shell within the evacuated cavity by two spaced apart posts, and the microbeam is disposed in the vicinity of the substrate. The photodiode is integrated into the substrate at a surface location beneath the microbeam. The first light transporter has a distal end and a proximate end, and the proximate end of the first optical fiber is disposed adjacent the outer surface of the shell to direct light from the first optical fiber to the photodiode and to the fluorescent region. The second light transporter has a distal end and a proximate end, the proximate end of the second light transporter is disposed at the outer surface of the shell so as to transmit light emitted by the fluorescent region, and the transmitted light indicates a frequency of vibration of the beam.

In accordance with yet a further aspect of the present invention, a pressure sensing device comprises a substrate having a photodiode and a fluorescent region, a shell having an outer surface and an inner surface, a beam affixed to the inner surface of the shell by two posts, and a light transporter having a distal end and an end proximate the outer surface of the shell in an area adjacent the beam and the fluorescent region.

In accordance with still a further aspect of the present invention, a pressure sensing device comprises a substrate having a photodiode and a fluorescent region, a shell having an outer surface and an inner surface, and a beam affixed to the inner surface of the shell by two posts.

In accordance with an additional aspect of the present invention, an optically powered integrated microstructure remote pressure sensor comprises a substrate, a microbeam, a photodiode, and a light transporter. The substrate supports a polysilicon shell having an outer surface and an inner surface, the inner surface defines an evacuated cavity enclosing an area of the substrate, and the substrate is provided with a fluorescent region. The microbeam is affixed to the inner surface of the shell within the evacuated cavity by two spaced apart posts, and the microbeam is disposed in the vicinity of the substrate. The photodiode is integrated into the substrate at a surface location beneath the microbeam. The light transporter has a distal end and a proximate end, the proximate end is disposed adjacent the outer surface of the shell to direct light to the photodiode and to the fluorescent region and to receive a light wave emitted by the fluorescent region, and the transmitted light indicates a frequency of vibration of the beam.

BRIEF DESCRIPTION OF THE DRAWING

These and other features and advantages will become more apparent from a detailed consideration of the invention when taken in conjunction with the drawings in which:

FIG. 6 illustrates an embodiment of a further exemplary aspect of the present invention.

DETAILED DESCRIPTION

Figure 1:
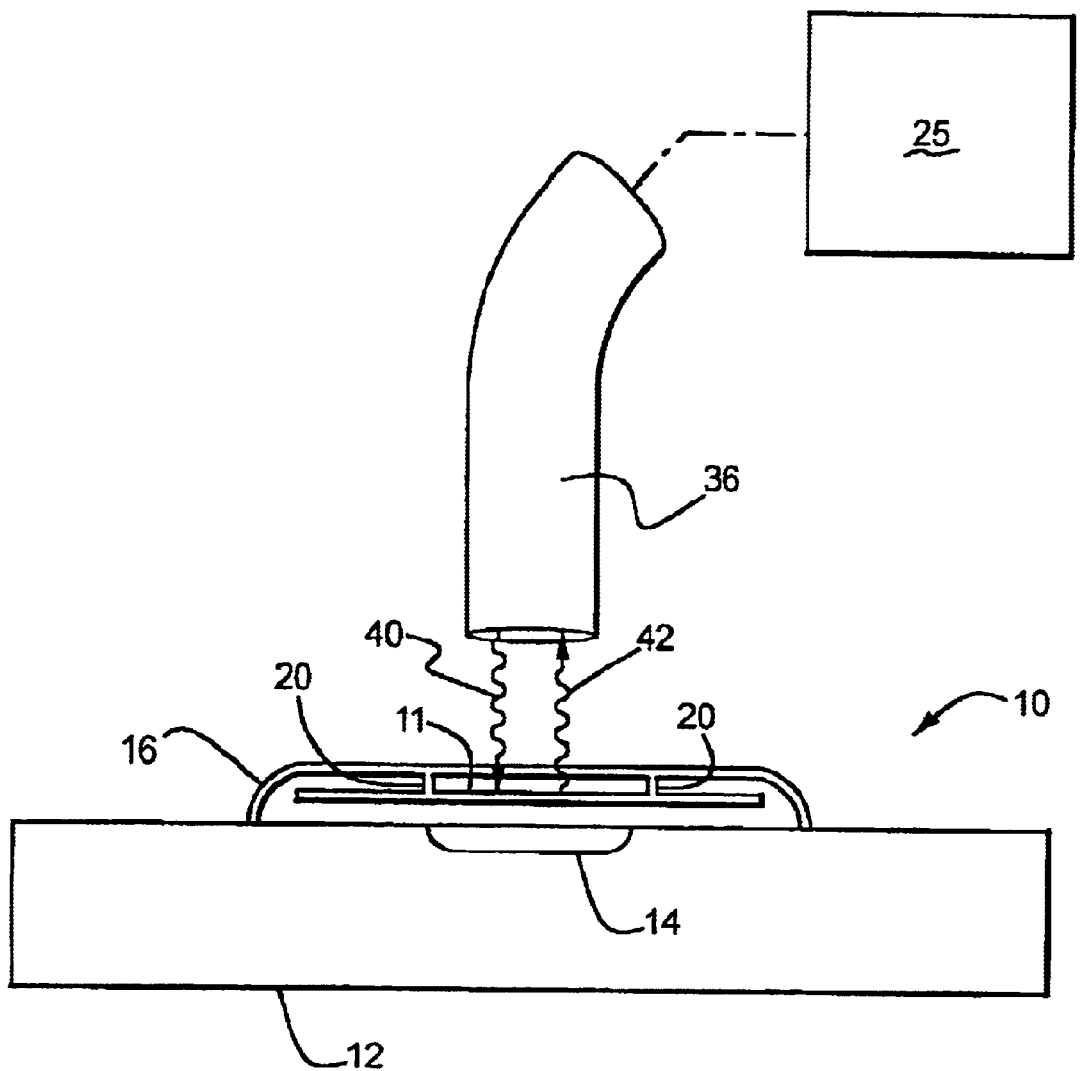
FIG. 1 illustrates an embodiment of an exemplary pressure sensor.

An embodiment of an exemplary aspect of an O-RIMS (optically powered resonant integrated microstructure) pressure sensing device 10 is shown in FIG. 1.

In the O-RIMS device 10, a microbeam 11 having a resonant frequency is held by supports 20, and is vacuum encapsulated by a polysilicon shell 16. The microbeam 11 and a shell 16 are situated upon and supported by a silicon substrate 12. The microbeam 11 and the shell 16 together form a micromachined integrated silicon device. The O-RIMS device 10 is further provided with an optical fiber 36 positioned outside the shell 16, but in proximity to the microbeam 11. The end of the optical fiber 36 is sufficiently close to the shell 16 and proximate to the microbeam 11 that an adequate signal-to-noise ratio is obtained.

The optical fiber 36 supplies a light wave 40 to the shell 16. The light wave 40 passes through the shell 16, partially through the microbeam 11, and on to a photodiode 14 situated beneath the microbeam 11. The shell 16 is partially reflective and partially transparent to the light wave 40. The light wave 40 passing through the shell 16 is partially reflected from the microbeam 11, through the shell 16, and back into the optical fiber 36.

The microbeam 11 is excited to resonance by the charge that accumulates on the photodiode 14 in response to the light wave 40. This charge creates an electrostatic attraction between the microbeam 11 and the photodiode 14. The electro-static attraction causes the microbeam 11 to flex, and as the microbeam 11 approaches its maximum flexure, its potential energy builds to a point where its restoring force overcomes the electrostatic attraction. The microbeam 11 then springs toward a neutral or resting position, where the electrostatic attraction builds again. This process excites resonance in the microbeam 11.

Pressure exerts a force on the shell 16 that is transmitted through the posts 20 to the microbeam 11. The frequency of vibration of the microbeam 11 is a function of this force which, in turn, is a function of the pressure.

The microbeam 11, the substrate 12 and the shell 16, form a Fabry-Perot cavity, such that the portions of a light wave 42 reflected from these surfaces interfere with one another as they re-enter the optical fiber 36, creating an optical signal whose intensity changes as the microbeam 11 vibrates. The beat frequency of the reflected light 42 indicates the frequency of vibration of the microbeam 11, and a sensor electronics package 25 evaluates the reflected light 42 to determine the vibratory frequency of the microbeam 11.

Figure 2:
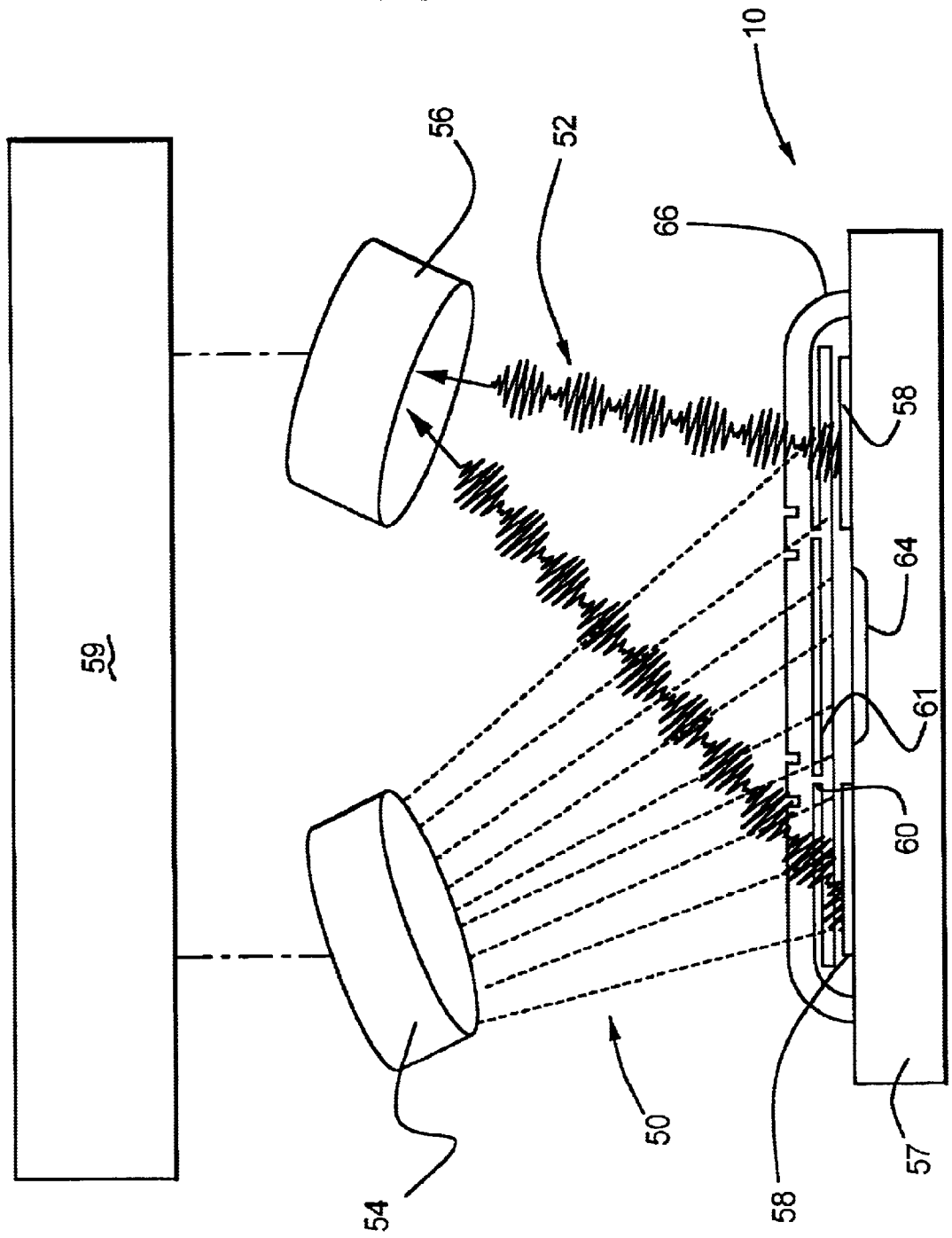
FIG. 2 illustrates an embodiment of an exemplary aspect of the present invention.

An exemplary embodiment of a pressure sensor according to the present invention is illustrated in FIG. 2.

According to the exemplary embodiment shown in FIG. 2, one or more regions 58 of a fluorescent material, such as erbium, are placed on the surface of a substrate 57, such as at locations directly beneath the distal ends of a microbeam 61. Thus, as the portion of the microbeam 61 immediately over a photodiode 64 moves up and down, the end portions of the microbeam 61 immediately over the fluorescent regions 58 vibrate accordingly. A light signal 50 (e.g., having a wavelength of 900 nm) is supplied by a light transporter 54 and drives the microbeam 61 into self-resonance. The light signal 50 also illuminates the fluorescent regions 58 causing the fluorescent material regions 58 to emit light 52 at a different wavelength (e.g., 1.55 microns). The light 52 is supplied to a sensor electronics package 59 through a light transporter 56.

A set of Fabry-Perot cavities is formed between the substrate 57, including the fluorescent regions 58, the microbeam 61, and the shell 66. The frequency of vibration of the microbeam 61 depends on the dimensions of the Fabry-Perot cavity, and the resonant frequency of the microbeam 61 changes when the support posts 60 are moved further apart or brought closer together, due to the pressure exerted on the outside of shell 66, since the support posts are connected to the shell 66. When the shell is deformed by the applied pressure, the posts 60 move further part or closer together, thereby affecting the resonant frequency of microbeam 61.

Moreover, the frequency at which the intensity of the light 52 varies is determined by the frequency of vibration of the microbeam 61, which in turn is related to the pressure applied to the shell 66. Accordingly, the beat frequency of the light 52 indicates pressure applied to the shell 66.

The present invention offers significant improvement in signal-to-noise ratio, particularly if the background light is low. Consider for example where an area of 10 cm×10 cm is illuminated with 1 milliwatt of 900 nm wavelength light. If the detectable area of the microbeam 61 is 100 microns by 10 microns, it is conceivable that a $1 \times 10^{-10}$ watt signal has $1 \times 10^{-3}$ watts of noise associated therewith. Such an arrangement produces a poor signal-to-noise ratio. However, there is often very little noise having a wavelength of 1.55 microns. Therefore, when the present invention is used, it is possible to acquire an approximately $1 \times 10^{-10}$ watt signal in less than $1 \times 10^{-10}$ watts of noise resulting in a $1 \times 10^6$ improvement in the signal-to-noise ratio.

Even in cases where there may be a lot of background light at 1.55 microns, the present invention can still be useful. As long as the intensity of the 1.55 micron light emitted from the erbium fluorescent region 58 is comparable to or greater than the intensity of the 1.55 micron background, there is a net gain in the signal-to-noise ratio. For example, the walls of a room lit with an incandescent light bulb might emit approximately $1 \times 10^{-8}$ Watts/cm$^2$ of light in the band from 1.54 to 1.56 microns. By contrast, the erbium (using the numbers from the example above) would emit $1 \times 10^{-5}$ Watts/cm$^2$ in the same band. In this example, a factor of 1000 improvement in the signal-to-noise ratio is achieved by using the present invention.

Although the present invention is discussed with respect to the use of 900 nm as the illuminating wavelength, erbium as the fluorescent material, and 1.55 microns as the detecting wavelength, many other combinations of illumination wavelength, fluorescent material, and detection wavelength are possible.

The present invention also allows for simplified packaging, in that the gap between the light transporters 54, 56, such as optical fibers or optical waveguides, and the device can be increased without adversely affecting the signal-to-noise ratio. Thus, the alignment tolerance can be relaxed, thereby making packaging of the sensor easier and cheaper.

In addition to self resonant operation discussed above, the microbeam 61 can be driven in a non-self-resonant mode using an externally modulated light source.

Figure 3:
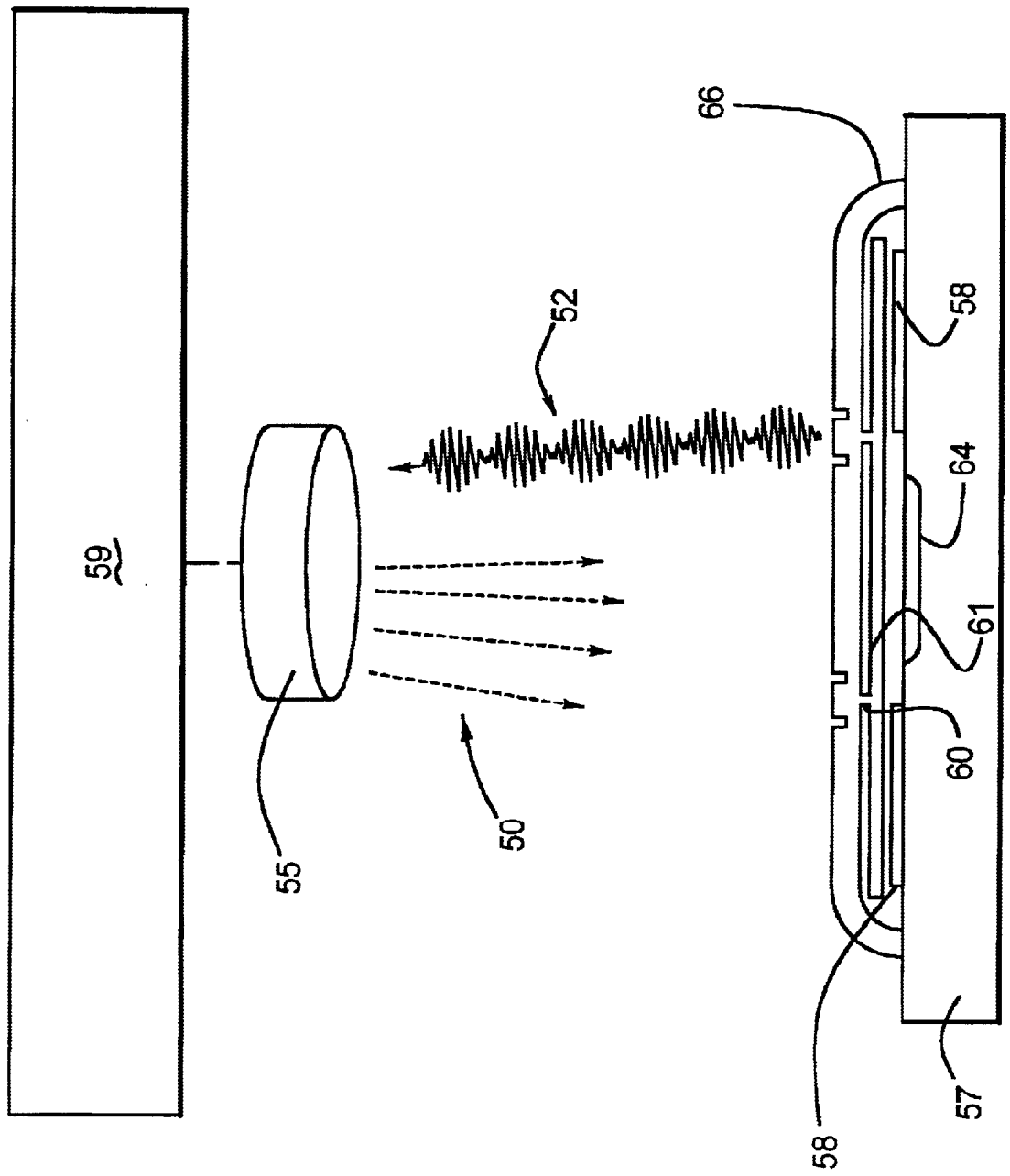
FIG. 3 illustrates an embodiment of another exemplary aspect of the present invention.

FIG. 3 illustrates another exemplary embodiment of a pressure sensor according to the present invention.

Instead of providing the input light transporter 54 and the output light transporter 56, the exemplary embodiment illustrated in FIG. 3 is capable of effective pressure measurement using a single light transporter 55. The light transporter 55 in this case can be in the form of an optical fiber or an optical waveguide, similar to the exemplary embodiment discussed with respect to FIG. 2.

The remaining elements of the sensor illustrated in FIG. 3, including the microbeam 61, the photodiode 64 and the shell 66, are the same in structure and function as described above with respect to the exemplary embodiment illustrated in FIG. 2.

The single light transporter 55 both delivers the input light 50 to the device in the manner described above with respect to FIG. 2, and collects the light 52 as it is modulated and returned from the sensor, also as discussed above. This dual function is performed by the light transporter 55 without adversely affecting the operability or efficiency of the sensor.

Figure 4:
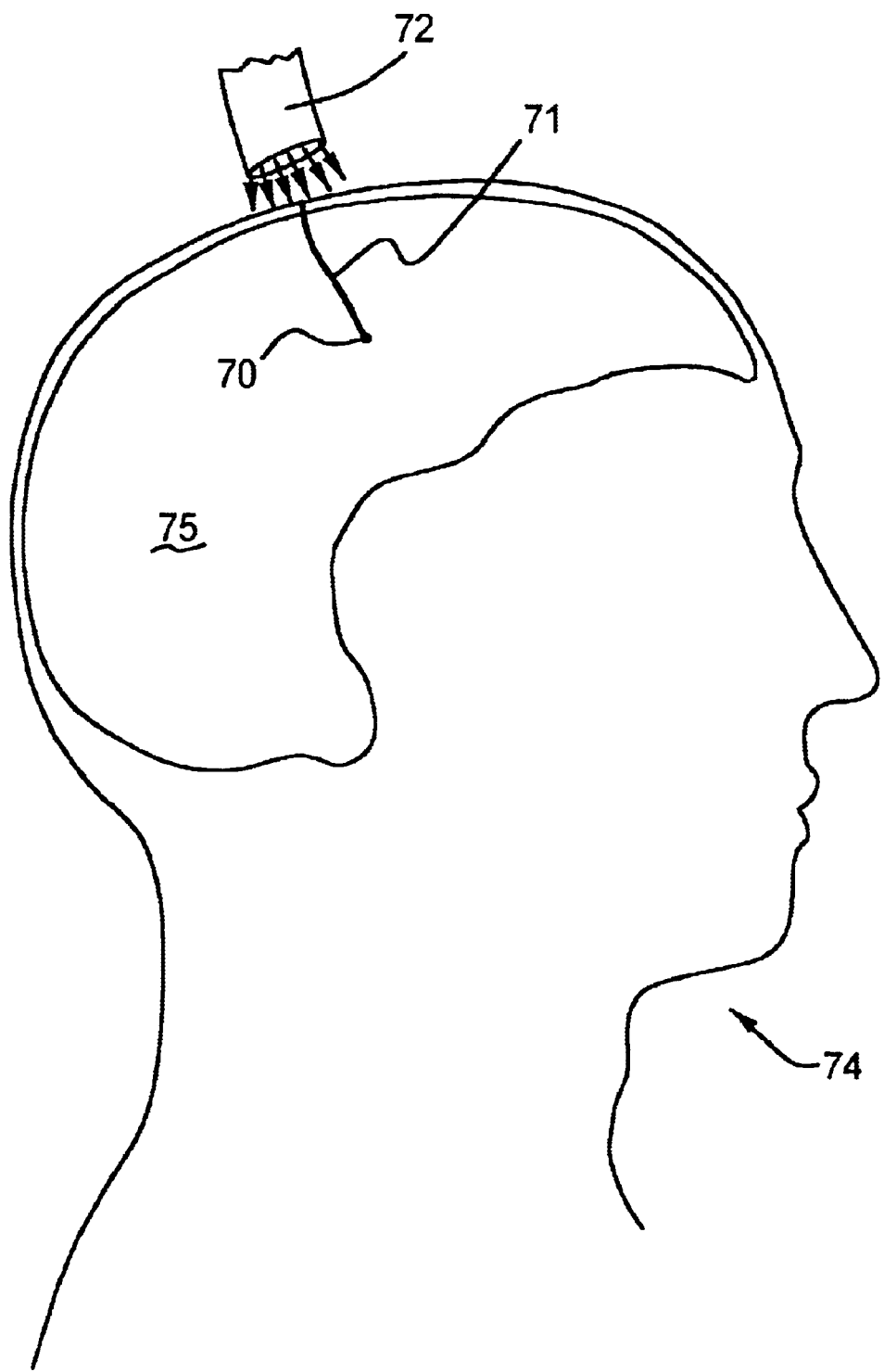
FIG. 4 illustrates an embodiment of still another exemplary aspect of the present invention.

FIG. 4 illustrates an exemplary medical implementation of the present invention. A pressure sensor 70 using this technology could be surgically implanted under the skin of a patient 74. The sensor 70 is dormant until it is illuminated by a 900 nm light source (e.g., at a doctor's office or at the patient's home). The 900 nm light passes through the patient's skin and into the body, causing the sensor 70 to go into resonance. Fluorescent light emitted by the erbium exits through the patient's skin and is detected by a nearby light transporter bundle 72, such as a fiber optic bundle or an optical waveguide bundle.

Alternatively, if a doctor wishes to monitor the pressure at locations in the body of the patient 74 that cannot be directly illuminated by light from outside the body, two usable options involving the present invention exist.

First, a light transporter 71, which may be in the form of an optical fiber or an optical waveguide, but will be discussed here in terms of an optical fiber, is connected between the sensor 70 (located, for example, inside the brain 75) and a location just beneath the skin of the patient 74. When light from outside the body shines on the portion of the fiber 71 just under the skin, the light would be carried along the fiber 71 to the sensor 70. Likewise, the emitted light from the sensor 70 would be carried along the fiber 71 to an adjacent area of the skin of the patient 74, where it could then be detected.

Second, a hollow tube could be connected from the sensor 70 located near the skin, or connected via the optical fiber 71 from a region near the skin, to the portion inside the body of the patient 74 where pressure is to be monitored.

The pressure sensor 70 of the exemplary embodiment illustrated in FIG. 4 has very fast response speeds and is highly accurate. Therefore, when correlating pressures and temperatures inside the brain 75, for example, it would be possible to determine whether subtle changes in pressure and temperature correlate and, if so, where intra-cranial leakage is occurring. The sensor 70 is very small, approximately 200 micrometers in diameter, so the measurements can be performed at several locations in the brain 75 with minimal trauma to the patient 72.

Figure 5:
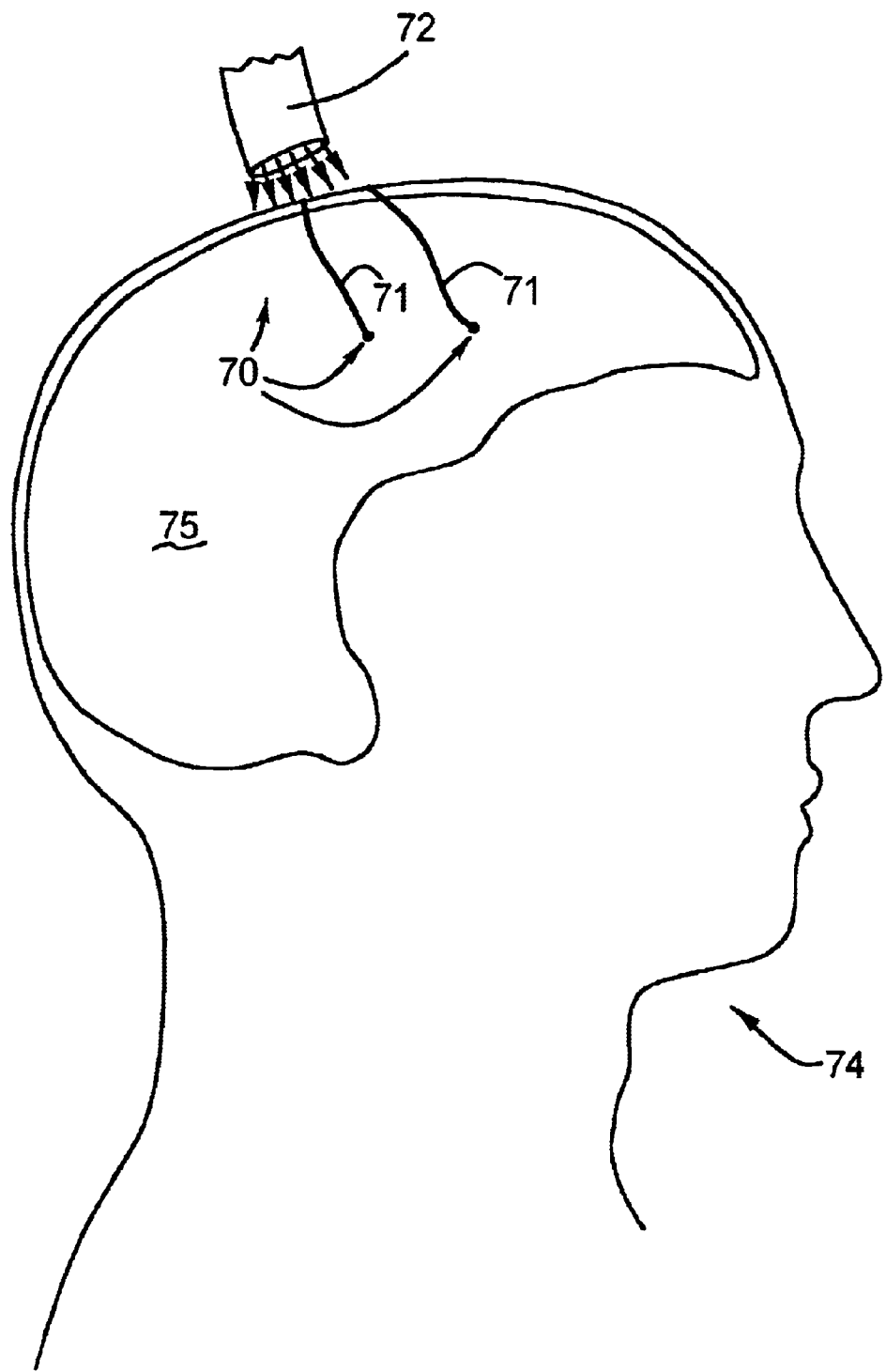
FIG. 5 illustrates an embodiment of yet another exemplary aspect of the present invention.

Another exemplary medical implementation of the present invention is shown in FIG. 5. While FIG. 4 shows only one sensor 70 in an implanted position in the patient 74, FIG. 5 shows that several similar sensors 70 can be implanted in the patient 74 in a likewise fashion.

A set of sensors 70 can be inserted into the patient's brain 75, or into any other part of the body of the patient 74, and a short light transporter 71, such as an optical fiber or an optical waveguide, run from each sensor 70 out through the skull and to the skin or scalp of the patient 74. The light transporter 71 terminates just below the surface of the skin or scalp, so the skin or scalp can heal over the fiber 71, thereby reducing the risk of infection. The light transporter bundle 72, such as an optical fiber bundle or an optical waveguide bundle, is brought next to the patient's skin or scalp at a location adjacent the embedded light transporter 71, and is positioned thereto whenever the physician (or the patient 74 himself) wants to take data from the sensors 70. Light from the light transporter bundle 72, such as a fiber bundle or waveguide bundle, shines through the patient's skin or scalp, into the implanted light transporter 71, and travels to the sensors 70 to provide them with optical power.

Each of the sensors 70 measures a specific property in the brain 75 of the patient 74 (e.g., pressure, temperature, magnetic field), uniquely modulating the reflectivity of the incoming light to optically encode the data according to each property. The encoded data is sent out through the same light transporter 71, such as optical fiber or optical waveguide, to the skin or scalp of the patient 74 where the light transporter bundle 72, such as fiber bundle or waveguide bundle, can pick up the signals and carry the data encoded light to a sensor electronics device (not shown) for evaluation.

In addition to measuring pressure in the brain 75 of a patient 74, the pressure sensor 70 of the present invention can be used to measure blood pressure, whereupon, a doctor could, for example, put the pressure sensor 70 in an artery leading from a patient's heart, thereby providing a high resolution, millisecond by millisecond plot of blood pressure which could be very useful in assessing the health of the patient's heart.

Moreover, since the pressure sensor 70 of the present invention can be made very small, and since it does not need to be connected to an electrical power source or even to an optical fiber, the sensor 70 could be inserted directly into the human body using a syringe.

Another exemplary embodiment of the present invention is illustrated in FIG. 6, which is similar in design and construction to the exemplary embodiments discussed above, except that instead of having two light transporters 54, 56, as illustrated in FIG. 2, or even a single light transporter 55, as shown in FIG. 3, or light transporters 71 shown in FIGS. 4 and 5, it is conceivable not to have any light transporter at all, without adversely affecting efficiency or accuracy of the pressure sensing ability of the present invention.

The structure and arrangement of the sensor components, such as the fluorescent region 58, the microbeam 61, the photodiode 64, and the shell 66, remain the same as in the exemplary embodiments discussed above. The only difference is, however, that no light transporter 54, 55 or 56 is provided proximate the shell 66 and adjacent the microbeam 61.

Instead, the light wave 50 generated by a light source, such as an LED or laser, and having a proper wavelength, is delivered to an area surrounding shell 66. The reflected light wave 52, which has been modulated by the vibratory motion of the microbeam 61 and influenced by the fluorescent region 58 as discussed above, is subsequently gathered by a light receiver. The light wave 52 is provided to sensor electronics (not shown) via the light receiver for evaluation to determine the frequency of vibration of the microbeam 61, as in the case of the other previously discussed exemplary embodiments. The frequency of vibration of the microbeam 61 is a function of the pressure exerted on the shell 66, which is indicated by the frequency at which the intensity of the light 52 varies.

In addition to the uses set forth above, a whole family of sensors, similar in design and construction to the present invention, can be created, including temperature sensors, magnetic field sensors, magnetic pole sensors, vibration sensors, accelerometers, shock sensors, and chemical sensors.

Modifications of the present invention will occur to those practicing in the art of the present invention.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A pressure sensing device comprising:
   a substrate having a fluorescent region;
   a shell having an outer surface and an inner surface;
   a beam affixed to the inner surface of the shell by two posts;
   a first light transporter having a distal end and an end proximate the outer surface of the shell in an area adjacent the beam and the fluorescent region; and
   a second light transporter having a distal end and an end proximate the outer surface of the shell in an area adjacent the beam and the fluorescent region.

2. The device of claim 1, further comprising a sensor circuit in communication with the distal end of the second light transporter.

3. The device of claim 1, wherein the substrate includes a photodiode illuminated by light from the first light transporter to excite the beam into vibration.

4. The device of claim 1, wherein the shell and the beam are at least partially light transmissive so that light from the first light transporter reaches the photodiode.

5. The device of claim 1, wherein the fluorescent region is responsive to a first light wave of a first wavelength from the first light transporter to generate a second light wave having a second wavelength, and wherein the second light wave is transmitted by the second light transporter.

6. The device of claim 1, wherein the substrate includes a photodiode illuminated by a first light wave of a first wavelength from the first light transporter to excite the beam into vibration, wherein the fluorescent region is responsive to the first light wave to generate a second light wave having a second wavelength, and wherein the second light wave has a property dependent upon a frequency of vibration of the beam and is transmitted by the second light transporter.

7. The device of claim 1, wherein the fluorescent region comprises erbium.

8. The device of claim 7, wherein the fluorescent region is illuminated by a light signal from the first light transporter having a wavelength of 900 nm.

9. The device of claim 1, wherein the shell defines an evacuated cavity enclosing the beam and the fluorescent region.

10. The device of claim 1, wherein the beam is excited to resonance based upon a photodiode.

11. The device of claim 1, wherein the substrate supports the shell and the beam.

12. The device of claim 1, wherein the shell, the beam and the substrate are micromachined.

13. The device of claim 1, wherein the device is used to sense pressure within an organism.

14. The device of claim 1, wherein the first and second light transporters are optical fibers.

15. The device of claim 1, wherein the first and second light transporters are optical waveguides.

16. A method for sensing pressure using a vacuum cavity device having at least one fluorescent region and a pressure sensitive resonant beam, the method comprising:

directing a first light wave toward the pressure sensitive resonant beam and the fluorescent region;

exciting the pressure sensitive resonant beam to a resonant frequency in response to the first light wave; and transmitting away from the pressure sensitive resonant beam a second light wave generated by the fluorescent region in response to the first light wave, the first and second light waves having different wavelengths, the second light wave having a property corresponding to the resonant frequency of the pressure sensitive resonant beam.

17. The method of claim 16, further comprising evaluating the second light wave in a sensor circuit.

18. The method of claim 16, wherein the exciting of the pressure sensitive resonant beam comprises directing the first light wave to a photodiode mounted proximate to the pressure sensitive resonant beam.

19. The method of claim 16, wherein the fluorescent region comprises erbium.

20. The method of claim 16, wherein the first light wave has a wavelength of 900 nm.

21. The method of claim 16, wherein the shell, the pressure sensitive resonant beam and the substrate are micromachined.

22. The method of claim 21, further comprising measuring pressure in a region of the human body as a function of the second light wave.

23. An optically powered integrated microstructure remote pressure sensor comprising:

a substrate supporting a polysilicon shell having an outer surface and an inner surface, the inner surface defining an evacuated cavity enclosing an area of the substrate, the substrate being provided with a fluorescent region;

a microbeam affixed to the inner surface of the shell within the evacuated cavity by two spaced apart posts, the microbeam disposed in the vicinity of the substrate;

a photodiode integrated into the substrate at a surface location beneath the microbeam;

a first light transporter having a distal end and a proximate end, the proximate end of the first optical fiber being disposed adjacent the outer surface of the shell to direct light from the first optical fiber to the photodiode and to the fluorescent region; and a second light transporter having a distal end and a proximate end, the proximate end of the second light transporter being disposed at the outer surface of the shell so as to transmit light emitted by the fluorescent region, wherein the transmitted light indicates a frequency of vibration of the beam.

24. The sensor of claim 23, further comprising sensor electronics receiving, through the distal end of the second light transporter, the light wave generated by the fluorescent region.

25. The sensor of claim 23, wherein the light received by fluorescent region from the first light transporter has a wavelength of 900 nm.

26. The sensor of claim 23, wherein the microbeam is excited to resonance by the photodiode.

27. The sensor of claim 23, wherein excitation of the microbeam comprises directing the first light wave onto the photodiode.

28. The sensor of claim 23, wherein the shell, the microbeam and the substrate are micromachined.

29. The sensor of claim 23, wherein the sensor measures pressure within the human body.

30. The sensor of claim 23, wherein the first and second light transporters are optical fibers.

31. The sensor of claim 23, wherein the first and second light transporters are optical waveguides.

32. A pressure sensing device comprising:

a substrate having a photodiode and a fluorescent region;

a shell having an outer surface and an inner surface;

a beam affixed to the inner surface of the shell by two posts; and a light transporter having a distal end and an end proximate the outer surface of the shell in an area adjacent the beam and the fluorescent region.

33. The device of claim 32, wherein the fluorescent region comprises erbium.

34. The device of claim 33, wherein the fluorescent region is illuminated by a light signal having a wavelength of 900 nm.

35. The device of claim 32, wherein the shell defines an evacuated cavity enclosing the beam and the fluorescent region.

36. The device of claim 32, wherein the beam is excited to resonance based upon the photodiode.

37. The device of claim 32, wherein the shell, the microbeam and the substrate are micromachined.

38. The device of claim 32, wherein the device is used to sense pressure within an organism.

39. The device of claim 32, wherein the shell and the beam are at least partially light transmissive so that light from the light transporter reaches the photodiode.

40. The device of claim 32, wherein the light transporter is an optical fiber.

41. The device of claim 32, wherein the light transporter is an optical waveguide.

42. A pressure sensing device comprising:

a substrate having a photodiode and a fluorescent region;

a shell having an outer surface and an inner surface; and a beam affixed to the inner surface of the shell by two posts.

43. The device of claim 42, wherein the photodiode is illuminated by a light to excite the beam into vibration.

44. The device of claim 42, wherein the shell and the beam are at least partially light transmissive so the light reaches the photodiode.

45. The device of claim 42, wherein the fluorescent region is responsive to a light of a first wavelength to generate a second light having a second wavelength, and wherein the second light has a property dependent upon a frequency of vibration of the beam.

46. The device of claim 42, wherein the fluorescent region comprises erbium.

47. The device of claim 42, wherein the fluorescent region is illuminated by a light having a wavelength of 900 nm.

48. The device of claim 42, wherein the shell defines an evacuated cavity enclosing the beam and the fluorescent region, and wherein the substrate supports the shell and the beam.

49. The device of claim 42, wherein the shell, the beam and the substrate are micromachined.

50. The device of claim 42, wherein the device is used to sense pressure within an organism.

51. An optically powered integrated microstructure remote pressure sensor comprising:
- a substrate supporting a polysilicon shell having an outer surface and an inner surface, the inner surface defining an evacuated cavity enclosing an area of the substrate, the substrate being provided with a fluorescent region;
- a microbeam affixed to the inner surface of the shell within the evacuated cavity by two spaced apart posts, the microbeam disposed in the vicinity of the substrate;
- a photodiode integrated into the substrate at a surface location beneath the microbeam; and
- a light transporter having a distal end and a proximate end, the proximate end being disposed adjacent the outer surface of the shell to direct light to the photodiode and to the fluorescent region, and to receive a light wave emitted by the fluorescent region, wherein the transmitted light indicates a frequency of vibration of the beam.

52. The sensor of claim 51, further comprising sensor electronics receiving, through the distal end of the light transporter, the light wave emitted by the fluorescent region.

53. The sensor of claim 51, wherein the light directed to the fluorescent region from the light transporter has a wavelength of 900 nm.

54. The sensor of claim 51, wherein the microbeam is driven to resonance by the photodiode.

55. The sensor of claim 51, wherein excitation of the microbeam comprises directing the light onto the photodiode.

56. The sensor of claim 51, wherein the shell, the microbeam and the substrate are micromachined.

57. The sensor of claim 51, wherein the sensor measures pressure within the human body.

58. The sensor of claim 51, wherein the light transporter is an optical fiber.

59. The sensor of claim 51, wherein the light transporter is an optical waveguide.

* * * * *